US006026721A

United States Patent [19]
Fukai

[11] Patent Number: 6,026,721
[45] Date of Patent: Feb. 22, 2000

[54] METHOD FOR MANUFACTURING VALVE DISCS OF FLUID DISPLACEMENT APPARATUS

[75] Inventor: Isamu Fukai, Maebashi, Japan

[73] Assignee: Sanden Corporation, Gunma, Japan

[21] Appl. No.: 08/766,797

[22] Filed: Dec. 13, 1996

[30] Foreign Application Priority Data

Dec. 13, 1995 [JP] Japan .................................... 7-346653

[51] Int. Cl.[7] ................................ B26F 1/38; F16D 13/38

[52] U.S. Cl. ................................ 83/39; 83/41; 29/890.12; 29/890.126; 192/89.22; 192/89.23; 192/89.24

[58] Field of Search ........................ 83/39, 41; 192/89.22, 192/89.23, 89.24; 29/890.12, 890.126, 558

[56] References Cited

U.S. PATENT DOCUMENTS

| | | | |
|---|---|---|---|
| 1,555,192 | 9/1925 | Dennedy . | |
| 1,694,939 | 12/1928 | Heftler | 83/41 |
| 1,748,531 | 2/1930 | Troup . | |
| 2,019,747 | 11/1935 | Taylor . | |
| 2,283,629 | 5/1942 | Heftler | 83/41 |
| 2,336,882 | 12/1943 | Nyden | 29/890.12 |
| 3,460,415 | 8/1969 | Philipp | 83/41 |
| 3,650,167 | 3/1972 | Hoffmeyer et al. | 83/41 |
| 3,715,943 | 2/1973 | Hirai et al. | 83/41 |
| 3,761,202 | 9/1973 | Mitchell . | |
| 3,963,105 | 6/1976 | Ernst et al. | 192/98 |
| 4,011,029 | 3/1977 | Shimizu . | |
| 4,132,103 | 1/1979 | Le Brise | 83/39 |
| 4,491,211 | 1/1985 | Steeg | 192/89 |
| 4,499,660 | 2/1985 | Lenz | 29/598 |
| 4,642,037 | 2/1987 | Fritchman . | |
| 4,688,594 | 8/1987 | Gardner et al. | 29/890.12 |
| 4,984,361 | 1/1991 | Woollatt et al. | 29/890.126 |
| 5,044,237 | 9/1991 | Frame | 83/41 |
| 5,213,488 | 5/1993 | Takahashi . | |
| 5,249,939 | 10/1993 | Takahashi . | |
| 5,636,432 | 6/1997 | Usher et al. . | |

FOREIGN PATENT DOCUMENTS

| | | | |
|---|---|---|---|
| 8905699 | 6/1989 | Japan | 83/916 |
| 5-288183 | 11/1993 | Japan | 29/890.12 |
| 737908 | 10/1955 | United Kingdom . | |
| 754454 | 8/1956 | United Kingdom . | |
| 2156046 | 10/1985 | United Kingdom . | |

*Primary Examiner*—Rinaldi I. Rada
*Assistant Examiner*—San A. Pryor
*Attorney, Agent, or Firm*—Baker & Botts, L.L.P.

[57] ABSTRACT

A method for manufacturing a first valve disc and a second valve disc for use in a compressor having a longitudinal axis and several cylinder chambers surrounding the axis is described. The method includes the steps of: providing a sheet of resilient valve material; stamping a through-hole having several extended openings out of the sheet to produce the first valve disc with several arms; and stamping several arch-shaped openings out of the sheet spaced around the through-hole corresponding to each of the extended openings of the through-hole to produce the second valve disc. Thus, an economical manufacturing method for obtaining a set of suction valve and discharge valve discs from a common surface area of sheet material is described. A small valve disc is obtained by stamping out the central portion of a larger valve disc. The total quantity of sheet material required for making a set of two kinds of valve discs thereby is reduced.

19 Claims, 15 Drawing Sheets

METHOD FOR MANUFACTURING VALVE DISCS OF FLUID DISPLACEMENT APPARATUS

BACKGROUND OF THE INVENTION

1. Field of the Invention

The invention relates to a method for manufacturing suction valve discs and discharge valve discs of fluid displacement apparatus, and in particular, to a method for manufacturing a set of suction valve discs and discharge valve discs for a reciprocating piston-type refrigerant compressor used in an automotive air conditioning system.

2. Description of Related Art

Reciprocating piston-type refrigerant compressors are known in the art. The refrigerant compressor includes a compressor housing defining a compression chamber in which successive piston strokes cause intake, compression, and discharge of a refrigerant gas, and such combination of strokes are repeatedly performed. Further, the compressor may include valve plates positioned at front and rear sides of cylinder block, which partition the compression chamber from the discharge chambers and the suction chambers. A suction valve disc and a discharge valve disc are mounted on both end surfaces of the front and rear valve plates. The valve plate has suction holes and discharge holes extending therethrough to allow communication between the compression chambers and the suction chambers and between the compression chamber and the discharge chamber. Suction valve discs and discharge valve discs, which are made of a resilient material, for example, a carbon steel having a thickness of about 0.3 mm, regulate the flow of the refrigerant gas and sealing engage the end surface of the valve plate when the operation of the compressor ceases.

FIG. 1*a* depicts an example of a suction valve disc, and FIG. 1*b* depicts an example of a discharge valve disc, made by a known method. Referring to FIG. 1*a*, within a large circular valve disc 55', several through-holes 55*b*, 55*c*, and 55*d* are stamp-cut. A plurality of equi-angularly spaced through-holes 55*b* are the passage holes for fixing bolts. A plurality of equi-angularly spaced, arch-shaped, through-holes 55*c* form valve reeds 55*e*. Thus, within this circular suction valve disc, outwardly projecting valve reeds 55*e* are formed. Further, a plurality of equiangularly spaced through holes 55*d* are located within base portions of each of valve reeds 55*e*, described above, allowing the passage of refrigerant from compression chamber into discharge chamber. Referring to FIG. 1*b*, a discharge valve disc 52 is depicted, which is substantially star-shaped having the same number of outwardly projected reed valve reeds 52*b* as valve reeds 55*e* in the suction valve disc 55', described above, and a central through-hole 52*a* for receiving a fixing bolt.

FIGS. 2*a–c* illustrate the method for manufacturing one suction valve disc according to the prior art. A detailed description of the steps of this method is as follows:

first, with reference to FIG. 2*a*, a square material sheet S1 is prepared;

second, with reference to FIG. 2*b*, various inner through-holes, 55*b* and 55*d* and arch-shaped openings 55*c* are stamped out; and third, with reference to FIG. 2*c*, outer edge 55*f* is stamped out to obtain the complete suction valve disc 55'.

FIGS. 3*a–c* illustrate the method for manufacturing one discharge valve disc according to the prior art. A detailed description of the steps of this method is as follows:

first, with reference to FIG. 3*a*, a square material sheet S2 is prepared, which is separate from the above-mentioned sheet S1 used for producing a suction valve disc;

second, with reference to FIG. 3*b*, a central through hole 52*a* is stamped out; and with reference to FIG. 3*c*, an outer edge 52*c* is stamped out to obtain the complete discharge valve disc 52.

Thus, known methods for manufacturing suction valve and discharge valve discs consume two separate material sheets S1 and S2, one for each kind of valve disc, giving rise to a significantly increased cost for the product. Moreover, in manufacturing methods for sets of suction valve and discharge valve discs, the material cost is a significant component. Therefore, it is desirable to reduce this material cost.

SUMMARY OF THE INVENTION

One solution to reduce the excess consumption of material for manufacturing suction valve and discharge valve discs is to take advantage of the dead area of the larger valve, i.e., the central portion of suction valve disc 55', which area is indicated as domain 55*g* in FIG. 2*c*. As may be seen, this central portion plays no functional role for the operation of the compressor. Only valve reed parts 55*e* of suction valve disc 55' in FIG. 2, act as valves to regulate the flow of refrigerant gas. Further, this dead area includes sufficient surface area to produce another small valve disc, so that this central portion may be used in order to make a discharge valve disc.

It is an object of the present invention to provide an economical method for making a set of suction valve and discharge valve discs for use in an automotive air conditioning compressor. This method significantly reduces material costs.

In an embodiment, the invention is a method for manufacturing a first valve disc and a second valve disc for use in a fluid displacement apparatus, e.g., a compressor, having a longitudinal axis and a plurality of cylinder chambers surrounding the axis. The method comprises the steps of providing a sheet of valve material; cutting a through-hole having a plurality of extended openings in the sheet to produce the first valve disc with a plurality of arms; and cutting a plurality of arch-shaped openings in the sheet, spaced around the through-hole and corresponding to each of the extended openings of the through-hole, to produce the second valve disc.

In another embodiment, the invention is a method for manufacturing a first valve disc and a second valve disc for use in a fluid displacement apparatus having a longitudinal axis and a plurality of cylinder chambers surrounding the axis. The method comprises the steps of providing a sheet of valve material; cutting a through-hole having a plurality of extended openings in the sheet to produce the first valve disc with a plurality of arms; and cutting away an outer portion of the sheet to form a plurality of arms on an inner portion of the sheet, spaced around the through-hole and corresponding to each of the extended openings of the through-hole, to produce the second valve disc.

In a further embodiment, the invention is a method for manufacturing a fluid displacement apparatus having a first valve disc having a plurality of outwardly projecting valve reeds and a second valve disc, which is substantially star-shaped and has a plurality of second outwardly projecting valve reeds corresponding to each of the plurality of outwardly projecting reed valves on the first valve disc. The method comprises the step of cutting the first and the second valve disc from a common surface area of sheet of valve material, wherein the first valve disc is cut from a central portion of the second valve disc, thereby forming a central through-hole in the second valve disc.

Other objects, features, and advantages of this invention will be understood from the following detailed description of preferred embodiments with reference to the drawings.

DETAILED DESCRIPTION OF PREFERRED EMBODIMENTS

Figure 4:
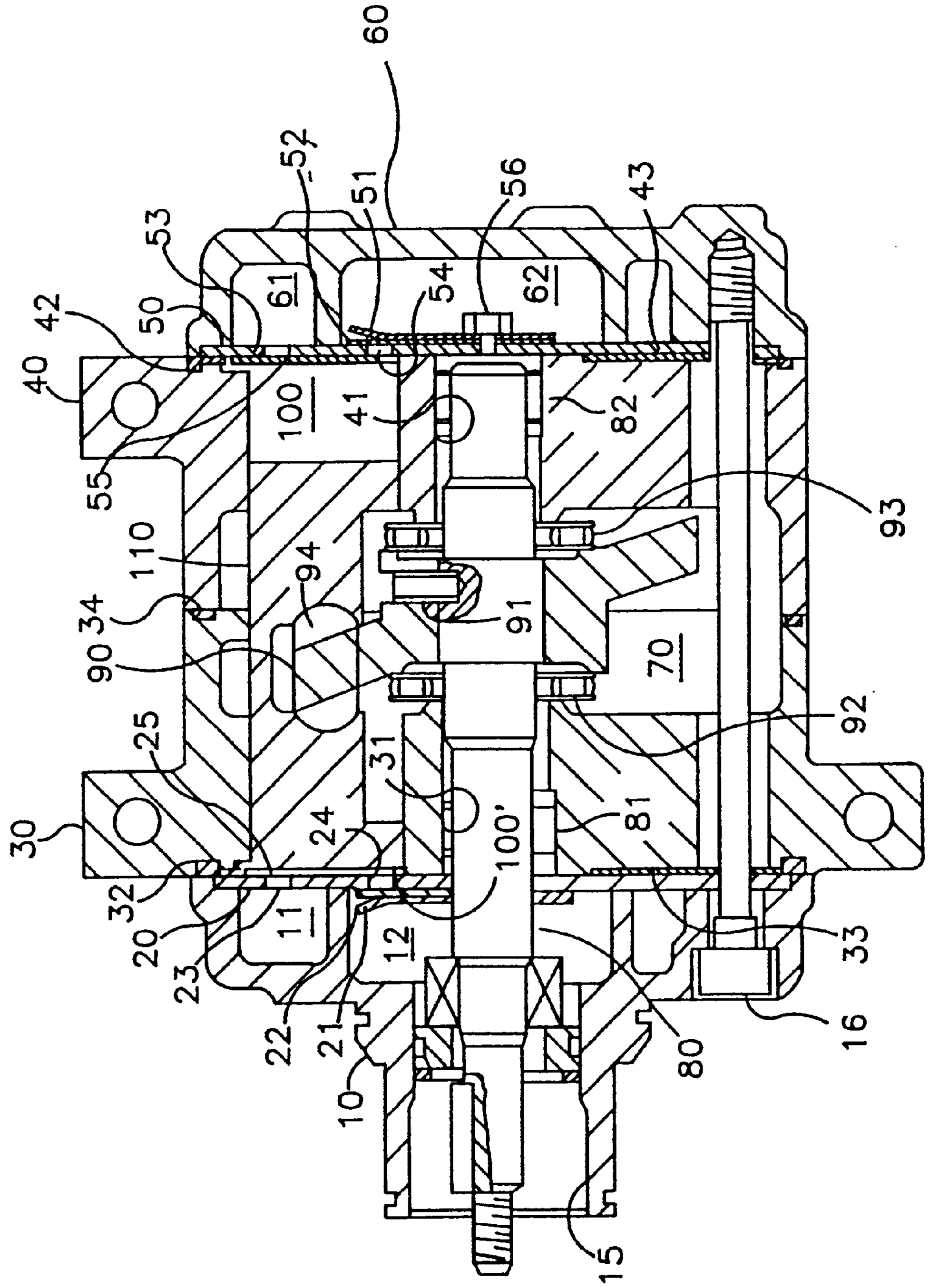
FIG. 4 is a longitudinal cross-sectional view of a slant plate-type refrigerant compressor equipped with suction valve and discharge valve discs manufactured in accordance with a first embodiment of the present invention.

With reference to FIG. 4, a fluid displacement apparatus equipped with suction valve discs, and discharge valve discs which are made by a method in accordance with a first embodiment of the present invention is depicted. The fluid displacement apparatus is described in terms of a slant plate-type compressor, but it will be readily appreciated by those skilled in the art that the invention may be adapted to other fluid displacement apparatus.

The compressor comprises front housing 10, valve plate 20, front cylinder block 30, rear cylinder block 40, valve plate 50, rear housing 60, and crank chamber 70. Crank chamber 70 is formed between front cylinder block 30 and rear cylinder block 40. Front housing 10, front valve plate 20, front cylinder block 30, rear cylinder block 40, rear valve plate 50, and rear housing 60 are fixed together by a plurality of bolts 16. Front valve plate 20 is located between front housing 10 and front cylinder block 30. Rear valve plate 50 is located between rear cylinder block 40 and rear housing 60. Opening 15 is centrally formed in front housing 10. The front and rear portions of drive shaft 80 are rotatably supported by needle bearings 81 and 82, which are each disposed within a central bore 31 and 41 of front and rear cylinder blocks 30 and 40, respectively. A set of suction valve discs 25 and discharge valve discs 22 are mounted on either side of front valve plate 20. Further a set of suction valve discs 55 and discharge valve discs 52 are mounted on either side of front valve plate 50.

Slant plate 90 is fixed on drive shaft 80 by pin member 91 and rotates with drive shaft 80. Front cylinder block 30 and rear cylinder block 40 include a plurality of peripherally located cylinder chambers 100' and 100, in which pistons 110 reciprocate. Each piston 110 is connected to slant plate 90 via sliding shoes 94 contacting both faces of the slant plate 90.

Both front housing 10 and rear housing 60 include peripherally located annular suction chambers 11 and 61, respectively, and centrally located discharge chambers 12 and 62, respectively. Front valve plate 20 is located between front housing 10 and front cylinder block 30 and includes a plurality of suction holes 23 linking each suction chamber 11 with respective cylinder chambers 100'. Rear valve plate 50 is located between rear cylinder block 40 and rear housing 60 and includes a plurality of suction holes 53 linking each suction chamber 61 with respective cylinder chambers 100.

Front valve plate 20 also includes a plurality of discharge holes 24 linking discharge chamber 12 with respective cylinder chambers 100'. Rear valve plate 50 also includes a plurality of discharge holes 54 linking discharge chamber 62 with respective cylinder chamber 100.

The compressor includes an inlet port (not shown) which is linked in fluid communication to suction chambers 11 and 61. The inlet port may be connected to an evaporator of an external cooling circuit (not shown). The compressor also includes an outlet port (not shown) which is linked in fluid communication to discharge chambers 12 and 62. The outlet port may be connected to a condenser of an external cooling circuit. O-ring seal elements 32, 34, and 42 seal the mating surfaces between front housing 10, front cylinder block 30, rear cylinder block 40, and rear housing 60.

A thrust bearing assembly 92 is disposed between the front end side of the boss portion of slant plate 90 and a mouth portion of bore 31 of front cylinder block 30. In addition, a thrust bearing assembly 93 is disposed between the rear end side of boss portion of slant plate 90 and a mouth portion of bore 41 of rear cylinder block 40.

Suction valve discs 25 and 55 and discharge valve discs 22 and 52, which are made of a resilient material, for example, carbon steel having a thickness of about 0.3 mm, regulate the flow of the refrigerant gas. A retainer plate 21 is provided on discharge valve disc 22 in front discharge chamber 12. The discharge valve disc 22 is fixed to valve plate 20, together with retainer plate 21 by a bolt (not shown, but positioned behind the drive shaft). In the front end surface of the front cylinder block 30, there is a recessed portion 33, the depth of which is equal to the thickness of suction valve disc 25. Suction valve disc 25 is fixedly sandwiched between valve plate 20 and recessed portion 33. Moreover, a retainer plate 51 is provided on discharge valve disc 52 in rear discharge chamber 62. Discharge valve disc 52 is fixed to valve plate 50, together with retainer plate 51 by bolt 56. In the rear end surface of rear cylinder block 40, there is a recessed portion 43, the depth of which is equal to the thickness of Suction valve disc 55. Suction valve disc 55 is fixedly sandwiched between recessed portion 43 and valve plate 50.

During operation of the fluid displacement apparatus, drive shaft 80 is rotated by the engine of the vehicle through an electromagnetic clutch (not shown). Slant plate 90 is driven with drive shaft 80, which in turn causes pistons 110 to reciprocate within their respective cylinders 100' and 100. As pistons 110 reciprocate, refrigerant gas introduced into suction chambers 11 and 61, through the inlet port, is compressed. The compressed refrigerant gas is discharged into discharge chambers 12 and 62 from each cylinder chamber 100' and 100 through discharge holes 24 and 54, respectively, and therefrom may discharge into the external cooling circuit through the outlet port.

Figure 2A:
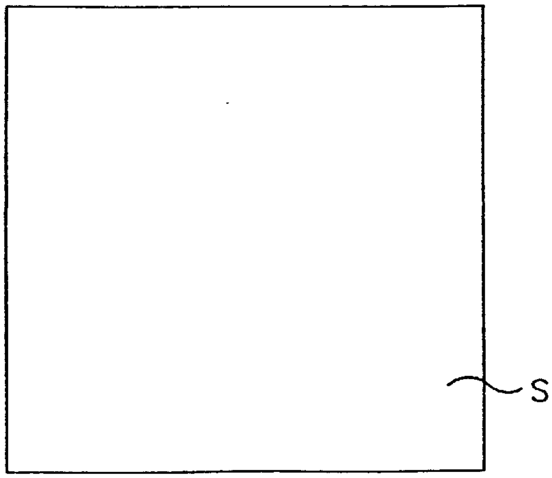
FIG. 2A (PRIOR ART)
FIGS. 2*a–c* illustrate the steps of the method of stamping out of a suction valve disc in accordance with the prior art.
Figure 5A:
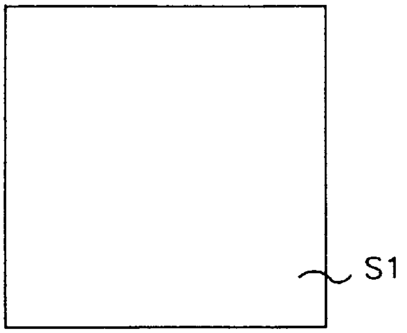
FIGS. 5*a–d* illustrate the steps of the method of stamping out of a suction valve disc in accordance with a first embodiment of the, present invention.
Figure 5B:
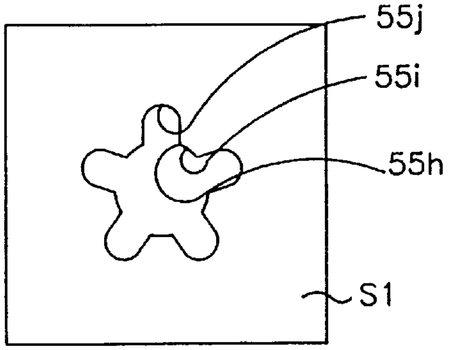
Figure 6A:
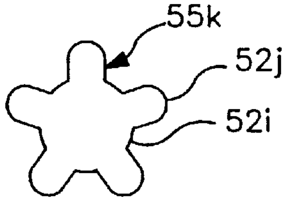
FIGS. 6*a–c* illustrate the steps of the method of stamping out of a discharge valve disc in accordance with a first embodiment of the present invention.
Figure 5C:
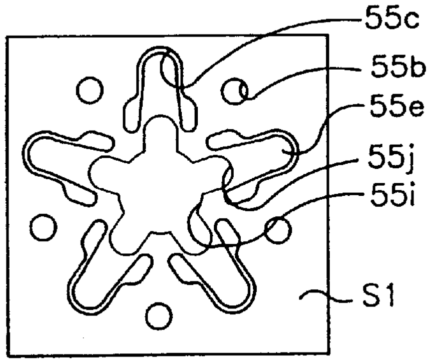
Figure 5D:
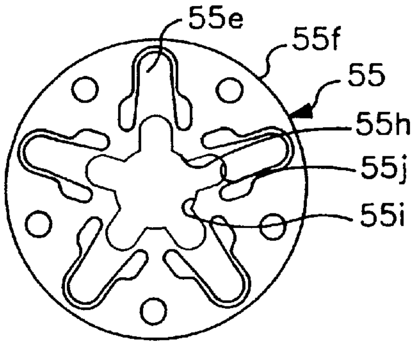

FIGS. 5*a–d* illustrate a method for manufacturing a suction valve disc in accordance with a first embodiment of the present invention. A detailed description of this method is as follows:

first, with reference to FIG. 5*a*, a square material sheet S1 is prepared, which is substantially the same as that shown in FIG. 2*a;* second, with reference to FIG. 5*b*, a geometrically central through-hole 55*h*, which is composed of concave edges 55*j* and circular edges 55*i*, is stamped out of sheet S1, so that corresponding blank 55*k*, which is simultaneously obtained, has a substantially star-shape, as illustrated in FIG. 6*a;* third, with reference to FIG. 5*c*, other inner through-holes 55*b* and 55*c* are stamped out of sheet S1; and fourth, with reference to FIG. 5*d*, an outer circular edge 55*f* is stamped out to obtain a complete suction valve disc 55.

Figure 6B:
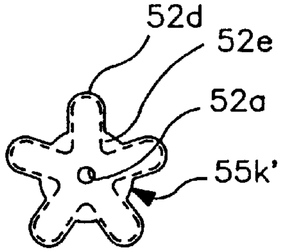
Figure 6C:
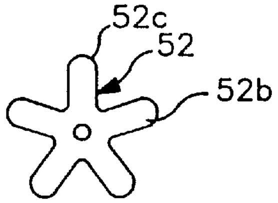

FIGS. 6*a–c* illustrate a method for manufacturing a discharge valve disc in accordance with a first embodiment of the present invention. A detailed description of this method is as follows:

first, with reference to FIG. 6*b*, using blank 55*k*, as illustrated in FIG. 6*a*, as a starting point a central through-hole 52*a* is stamped out; and second, with reference to FIG. 6*c*, an outer edge 52*c* is stamped out to obtain a complete discharge valve disc 52. Thus, arch-shaped peripherals 52*d* and sector portions 52*e* are removed from scrap 55*k'*, as illustrated in FIG. 6*b*.

Figure 2B:
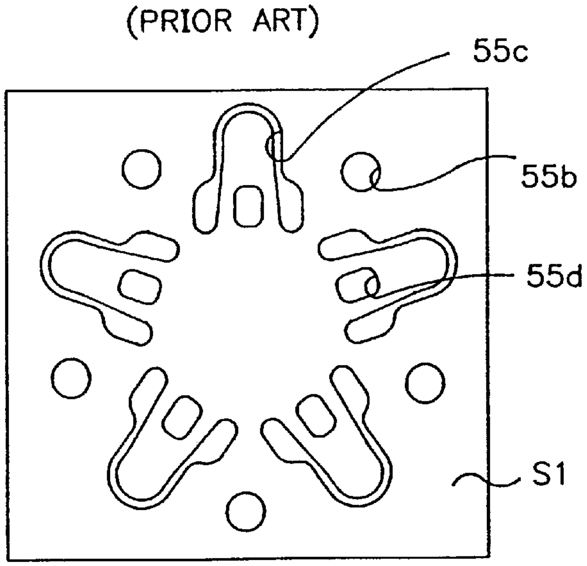
FIG. 2B (PRIOR ART)
Figure 3B:
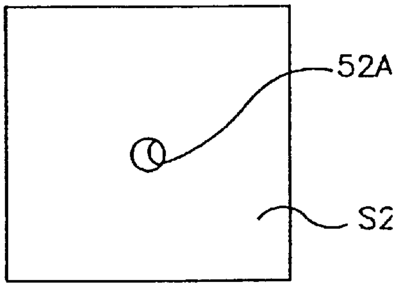
FIG. 3B (PRIOR ART)
Figure 2C:
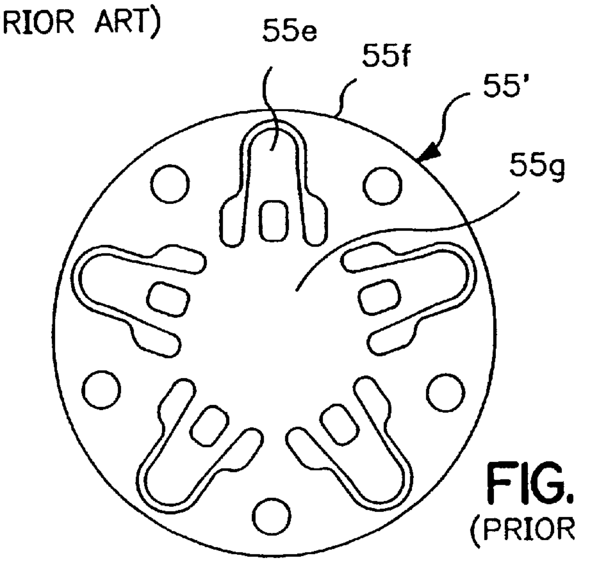
FIG. 2C (PRIOR ART)
Figure 3C:
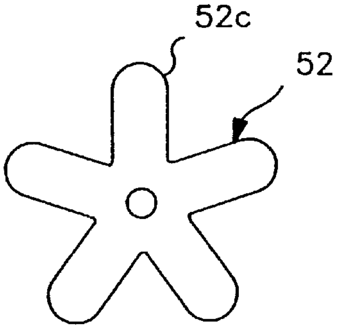
FIG. 3C (PRIOR ART)

With reference to FIGS. 5*a–d* and FIGS. 6*a–c*, through-holes 55*b* and 55*c* are substantially the same as those depicted in FIGS. 2*b* and 2*c*. However, in addition to these through-holes and openings, a central through-hole 55*h* is stamped out to be substantially star-shaped, and this is one of the main features of the present invention. The shape of the central through-hole 55*h* is made to be substantially star-shaped. Central through-hole 55*h* has concave edges 55*j* that are formed within the base portions of valve reeds 55*e* of the suction valve disc 55. Moreover, circular edges 55*i* are formed between concave edges 55*j*. FIG. 6*a* depicts blank scrap 55*k*, which is obtained by stamping out the central throughhole 55*h*, as shown in FIG. 5*b*. Consequently, the shape of inner edges 55*i* and 55*j* of suction valve disc 55 coincides with the outer edges 52*j* and 52*i* of blank 55*k*.

Referring to FIGS. 6*b* and 6*c*, one reason for removing the sector portions 52*e* from blank 55*k'* is to obtain sufficient length of projections 52*b* to act as valve reeds. The resultant discharge valve disc 52 has a star-shape similar to that of blank 55*k* and has the same number of outwardly projected valve reeds 52*b* as valve reeds 55*e* within suction valve disc 55.

Figure 7:
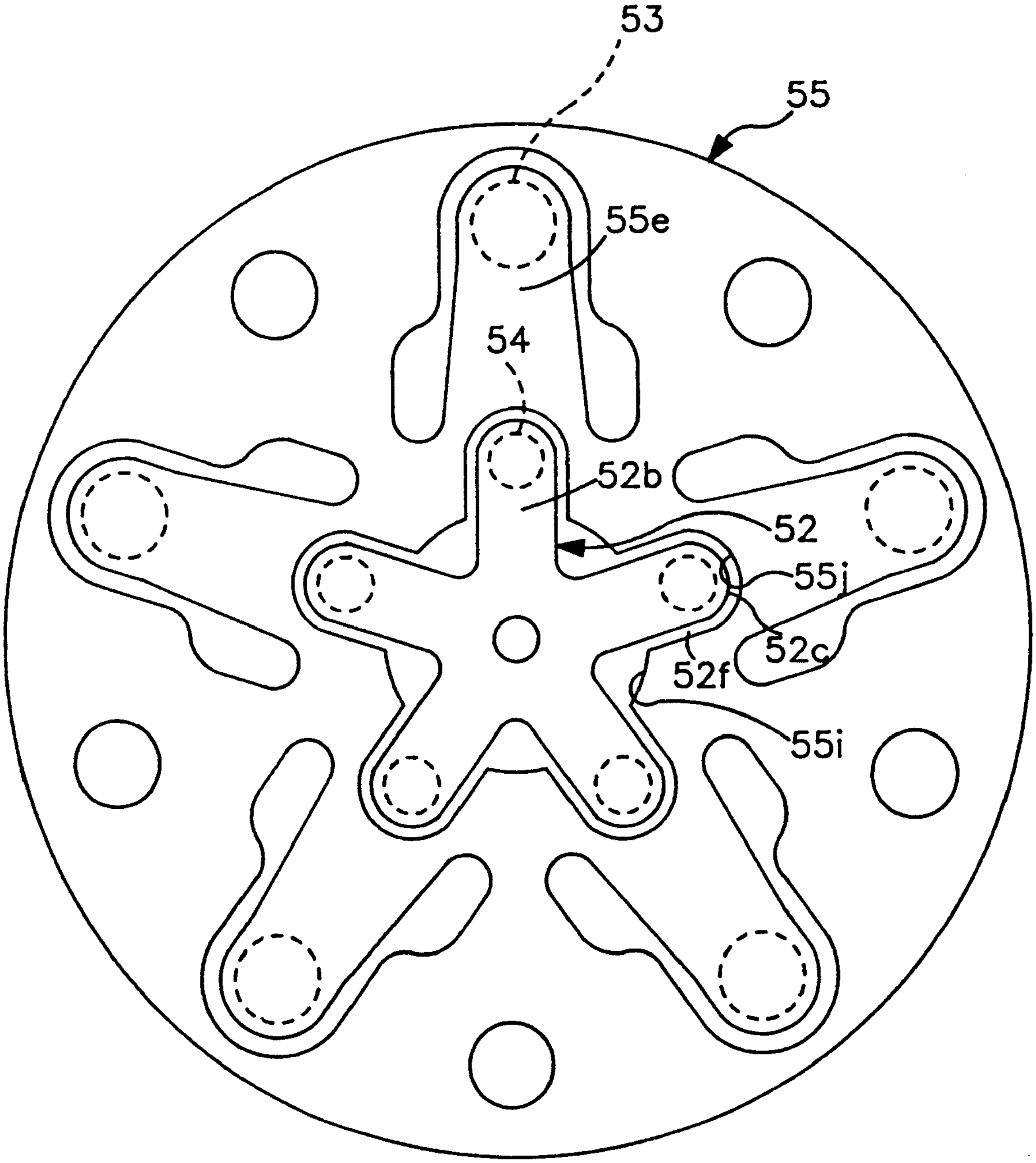
FIG. 7 is a plan view that shows the relative disposition of suction valve and the discharge valve discs made by a method in accordance with a first embodiment of the present invention, when assembled within a compressor.
Figure 8:
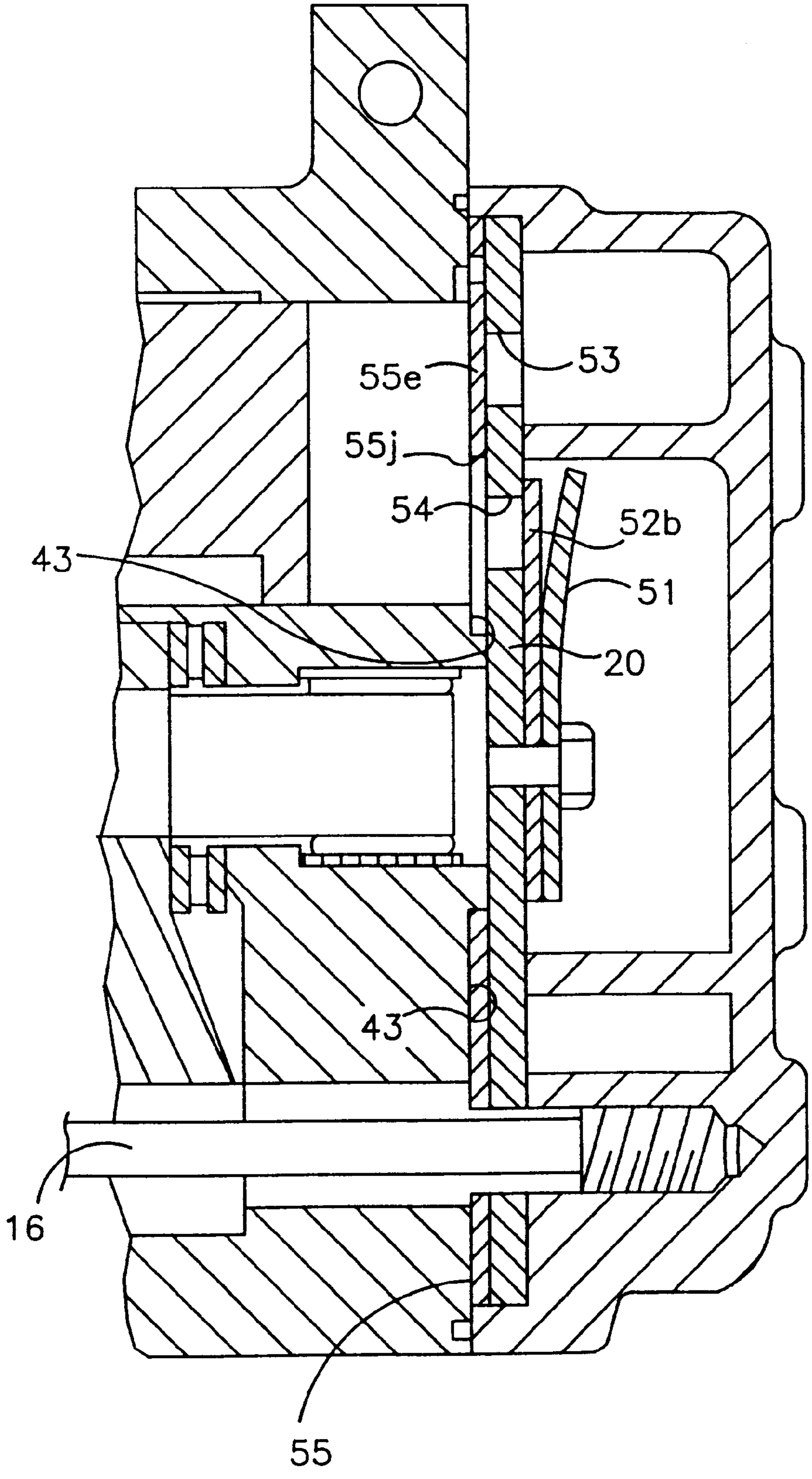
FIG. 8 is an enlarged partial view of FIG. 4, depicting the rear portion of a slant plate-type refrigerant compressor equipped with suction valve and discharge valve discs made by a method according to a first embodiment of the present invention.

FIG. 7 depicts the relative disposition of suction valve disc 55 and discharge valve disc 52, manufactured by the methods described above when they are assembled within a compressor. Valve reeds 55*e* of suction valve disc 55 regulate the intake flow of refrigerant passing through suction holes 53, and valve reeds 52*b* of discharge valve disc 52 regulate the refrigerant out flow passing through discharge holes 54. In FIG. 7, both of suction valve disc 55 and discharge valve disc 52 are drawn with rigid lines for convenience, however, in actual assemblage, the two valve discs are mounted on the opposite end surfaces of valve plate 50, as depicted in FIG. 8. Referring to FIGS. 7 and 8, inner edge 55*j* of suction valve disc 55 does not touch outer edge 52*c* of discharge valve disc 52 when assembled. Therefore, inner edge 55*j* does not interfere with the functioning of discharge valve 52, even if interstice 52*f*, which corresponds to the removed peripheral margin 52*d* (see FIG. 6*b*), is narrow.

Referring again to FIG. 7, as a result of these manufacturing methods, the shape of inner edge 55*i* and 55*j* of suction valve disc 55 are substantially similar to the shape of outer edge 52*c* of discharge valve disc 52, e.g., substantially star-shaped with five outward projections.

Figure 3A:
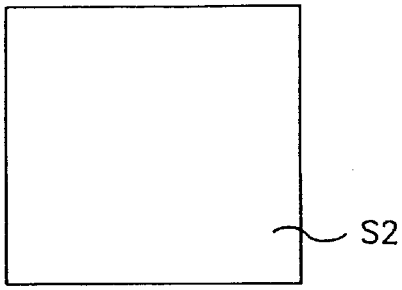
FIG. 3A (PRIOR ART)
FIGS. 3*a–c* illustrate the steps of the method of stamping out of a discharge valve disc in accordance with the prior art.

With reference again to FIGS. 2*a–c* and 3*a–c*, sheet S1 of FIG. 2*a* represents a minimum surface area of sheet material required for producing one suction valve disc, and sheet S2 of FIG. 3*a* represents a minimum surface area of sheet material for producing one discharge valve disc according to the prior art. While sheet S1 of FIG. 5*a*, which has substantially the same surface area as that shown in FIG. 2*a*, represents the minimum surface area of sheet material required for producing one set of suction valve and discharge valve discs according to the present invention.

Therefore, at least the surface area of sheet S2 is saved by producing the discharge valve disc according to the present invention.

Both the suction valve and discharge valve discs are obtained together from a common, limited surface area of sheet material. As a consequence, substantial cost reductions are attained by making the suction valve and discharge valve discs according to the present invention.

Figure 1B:
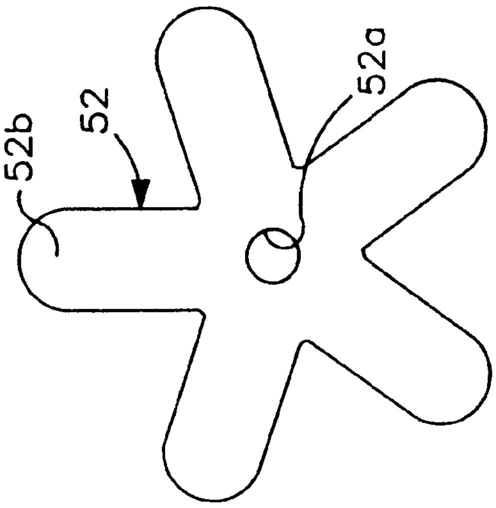
FIG. 1B (PRIOR ART)
FIG. 1*b* is a plan view of a discharge valve disc made by a method in accordance with the prior art.
Figure 1A:
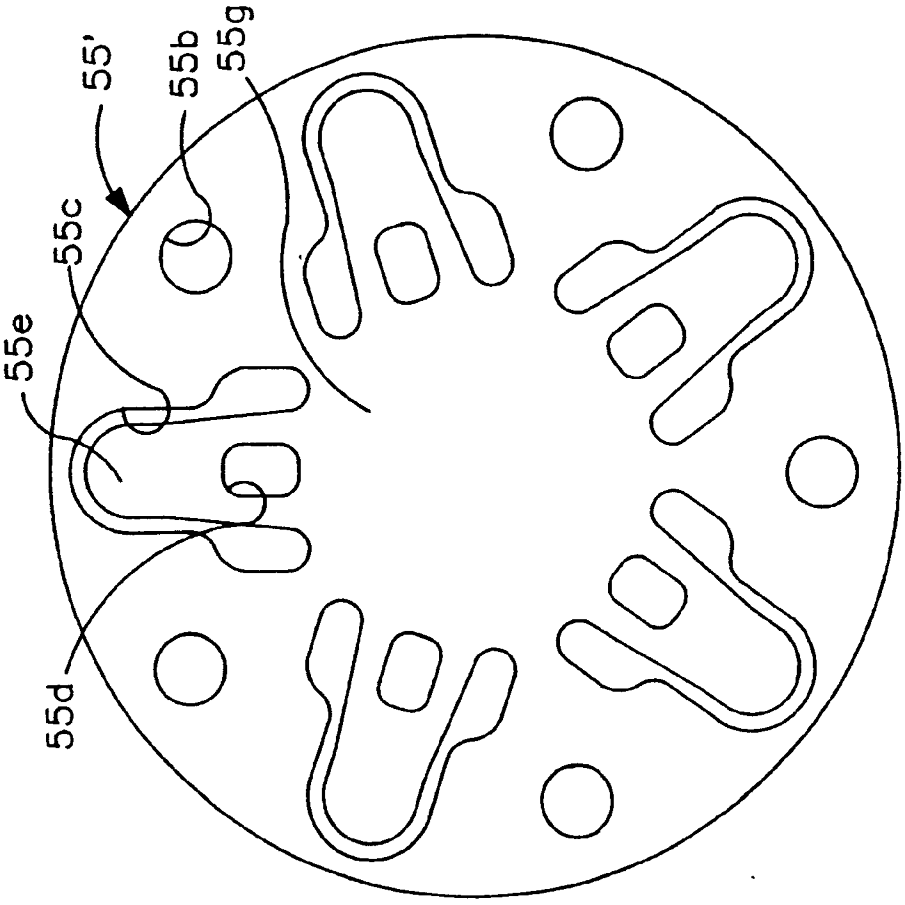
FIG. 1A (PRIOR ART)
FIG. 1*a* is a plan view of a suction valve disc made by a method in accordance with the prior art.
Figure 9A:
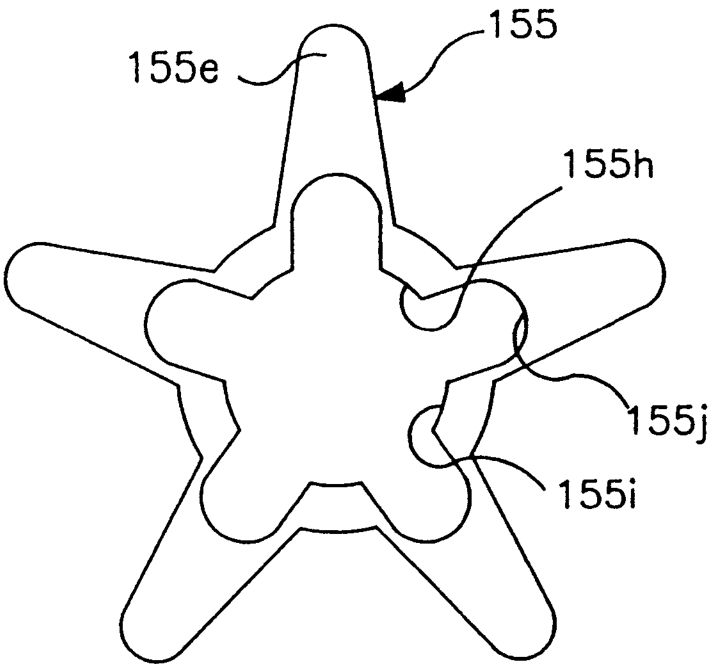
FIG. 9*a* is a plan view of a suction valve disc manufactured by the method in accordance with a second embodiment of the present invention.
Figure 9B:
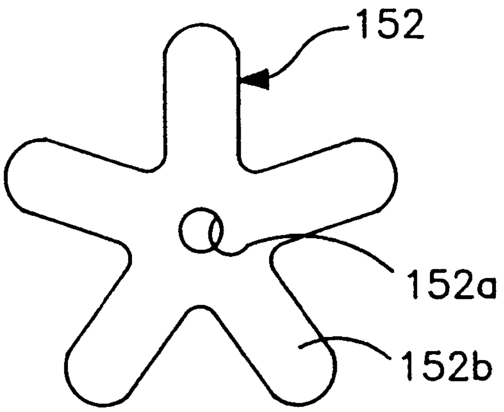
FIG. 9*b* is a plan view of a discharge valve disc manufactured by the method in accordance with a second embodiment of the present invention.
Figure 10A:
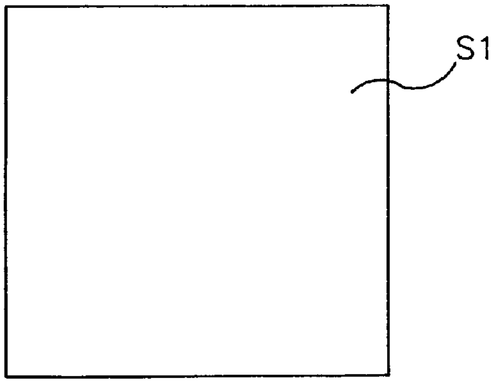
FIGS. 10*a–c* illustrate the steps of the method of stamping out of a suction valve disc in accordance with a second embodiment of the present invention.
Figure 10B:
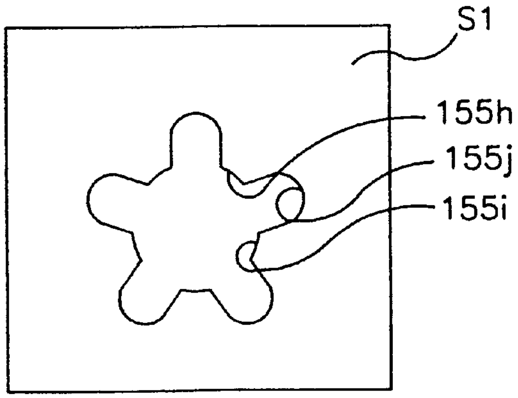
Figure 10C:
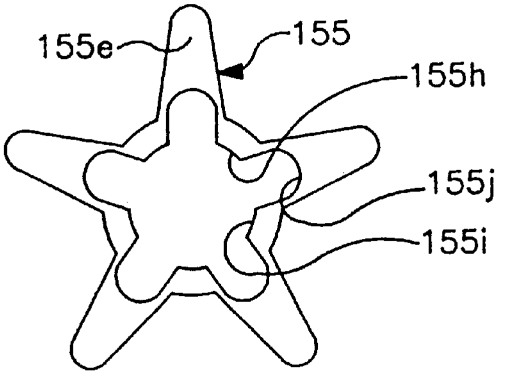
Figure 11A:
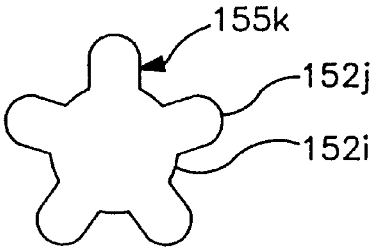
FIGS. 11*a–c* illustrate the steps of the method of stamping out of a discharge valve disc in accordance with a second embodiment of the present invention.
Figure 11B:
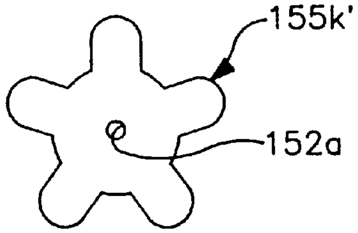
Figure 11C:
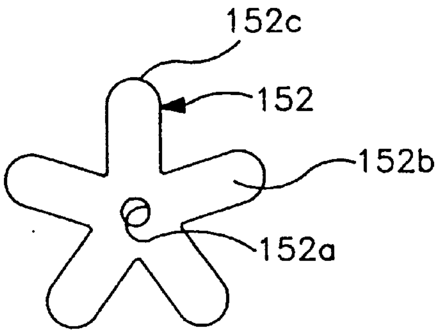
Figure 12:
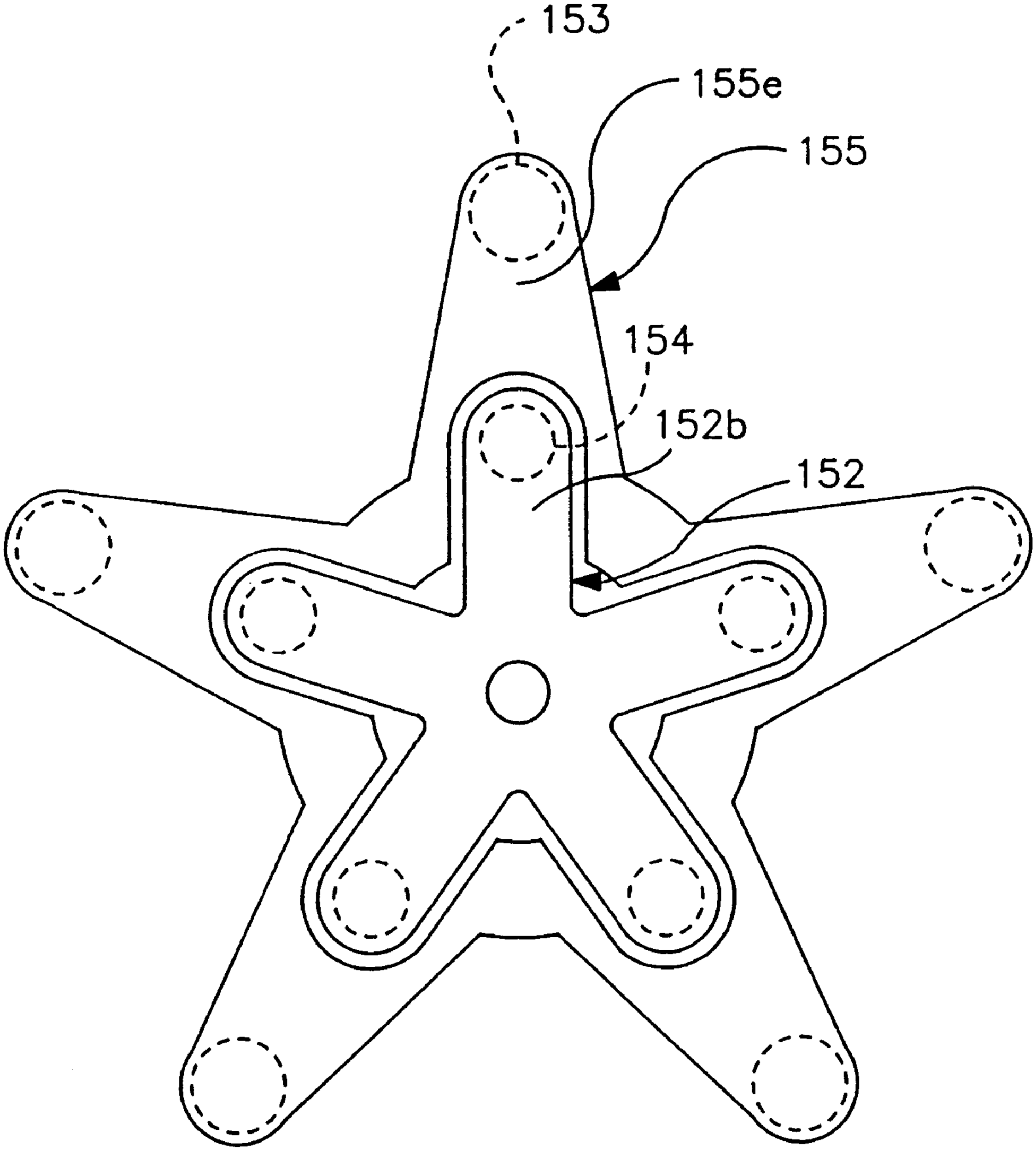
FIG. 12 is a plan view that shows the relative disposition of suction valve and discharge valve discs made by a method in accordance with a second embodiment of the present invention, when assembled within a compressor.
Figure 13:
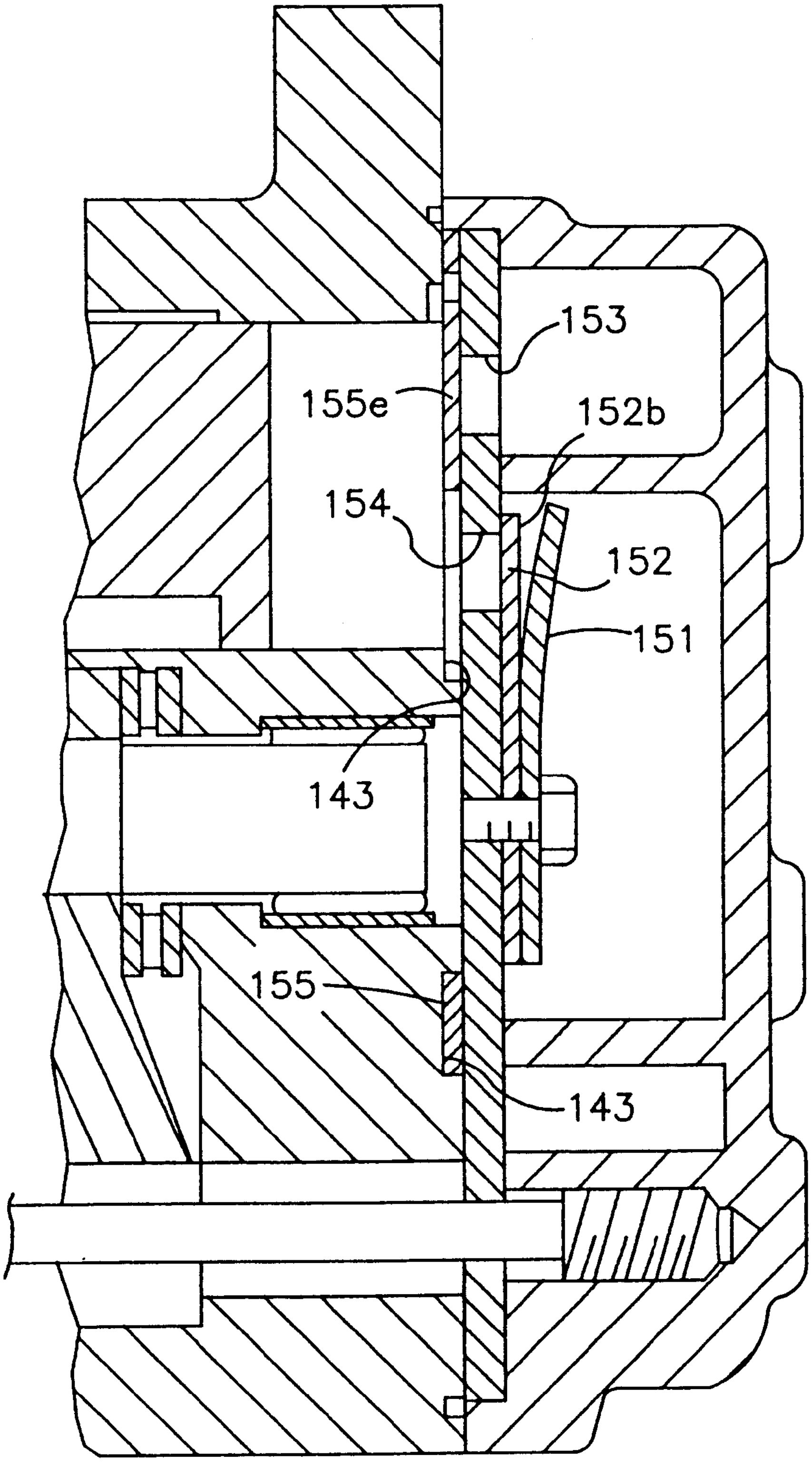
FIG. 13 is a partial, cross-sectional view of the rear portion of a slant plate-type refrigerant compressor equipped with suction valve and discharge valve discs made by a method in accordance with a second embodiment of the present invention.

While the first embodiment of the present invention describes a compressor configuration in which the shape of the outer edge of the suction valve disc is circular; the invention is not limited to such compressor configurations. FIGS. 9–13 illustrate a second embodiment of the present invention, in which, for example, the outer edge of the suction valve disc is star-shaped. In FIGS. 9*a* and 9*b*, a set of suction valve discs 155 and discharge valve discs 152 are shown which are manufactured by the method of the present invention. In this second embodiment, the shape of the outer edge of both of the suction valve and the discharge valve discs are substantially star-shaped. Referring to FIG. 9*a*, suction valve disc 155 has valve reeds 155*e* and a geometrically central through-hole 155*h* having concave edges 155*j* and circular edges 155*i*. Referring to FIG. 9*b*, discharge valve disc 152 is depicted as having valve reeds 152*b* and a geometrically central through-hole 152*a*. FIGS. 10*a*–*c* illustrate a method for manufacturing suction valve disc 155 in accordance with the second embodiment of the present invention. With reference to FIG. 10*a*, a square material sheet S1 is prepared, which is substantially the same as that shown in FIG. 2*a*. With reference to FIG. 10*b*, a geometrically central through-hole 155*h* having concave edges 155*j* and circular edges 155*i* is stamped from sheet S1, so that corresponding blank 155*k* is substantially star-shaped and simultaneously obtained, as illustrated in FIG. 1*a*. With reference to FIG. 10*c*, suction valve disc 155 having valve reeds 155*e* is stamped from sheet S1. Further, FIGS. 11*a*–*c* illustrate a method of manufacturing a discharge valve disc 152 in accordance with the second embodiment of the present invention. With reference to FIG. 11*a*, blank scrap 155*k* is depicted. Blank scrap 155*k* is obtained by stamping out the central through-hole 155*h*, as shown in FIG. 10*b*. Blank scrap 155*k* has outer edges 152*i* and 152*j*, which correspond to the shape of inner edges 155*i* and 155*j* of suction valve disc 155. With reference to FIG. 11*b*, blank 155*k'* depicts blank 155*k*, as illustrated in FIG. 11*a*, with a central through-hole 152*a* stamped out. With reference to FIG. 11*c*, a discharge valve 152 is depicted. Portions from blank 155*k'*, as shown in FIG. 11*b*, are removed to provide sufficient length for projections 152*b* to act as valve reeds. For example, outer edge 152*c* is stamped from blank 155*k'* to form projections 152*b*. As described with respect to the first embodiment of the present invention, a central blank 155*k* is stamped out from the center of a square sheet of disc material (FIGS. 10*b* and 11*a*). Blank 155*k* is then used to obtain a discharge valve disc 152. On the other hand, as illustrated in FIG. 10*b*, a larger and substantially star-shaped suction valve disc 155 is stamped out of the portion of the sheet remaining after removal of blank 155*k*. FIG. 12 depicts the relative disposition of suction valve disc 155 and discharge valve disc 152, when they are assembled within a compressor. As depicted with respect to the first embodiment, valve reeds 155*e* of suction valve disc 155 regulate the intake flow of refrigerant passing through suction holes 153, and valve reeds 152*b* of discharge valve disc 152 regulate the refrigerant outflow passing through discharge holes 154. This operation may be seen in FIG. 13, which depicts a cross-sectional view of a rear portion of a compressor equipped with suction valve disc 155 and discharge valve disc 152. Recessed portion 143 has a depth equal to the thickness of suction valve disc 155. Suction valve disc 155 is placed in recessed portion 143. A retainer plate 151 is provided on discharge plate valve disc 152.

Figure 14A:
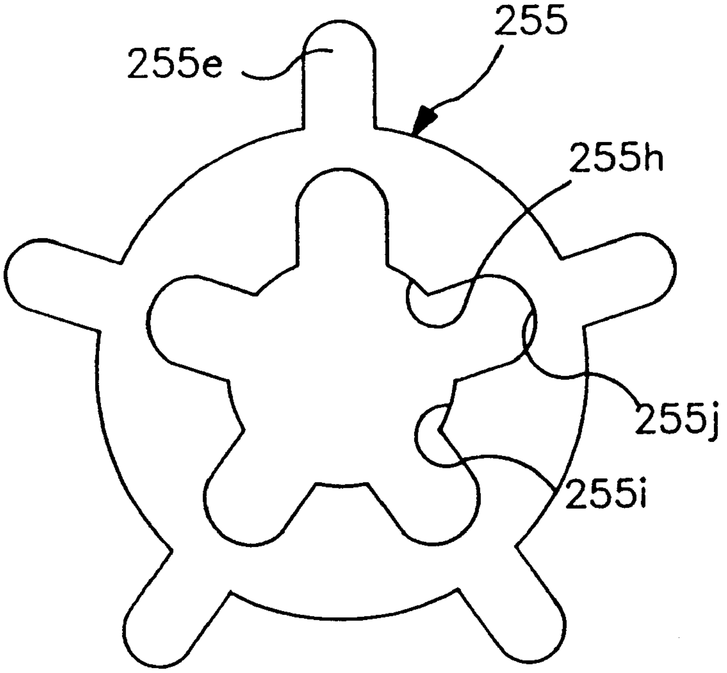
FIG. 14*a* is a plan view of a discharge valve disc manufactured by the method in accordance with a third embodiment of the present invention.
Figure 14B:
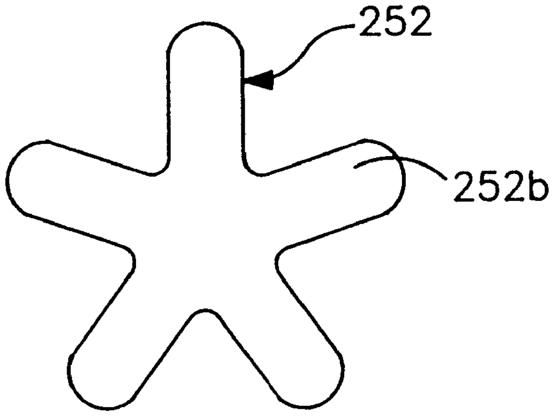
FIG. 14*b* is a plan view of a suction valve disc manufactured by the method in accordance with a third embodiment of the present invention.
Figure 15A:
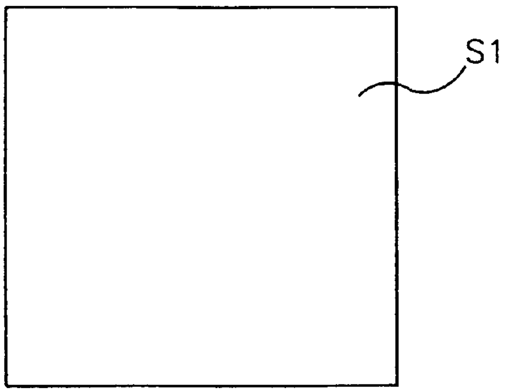
FIG. 15*a–c* illustrate the steps of the method of stamping out of a discharge valve disc in accordance with a third embodiment of the present invention.
Figure 15B:
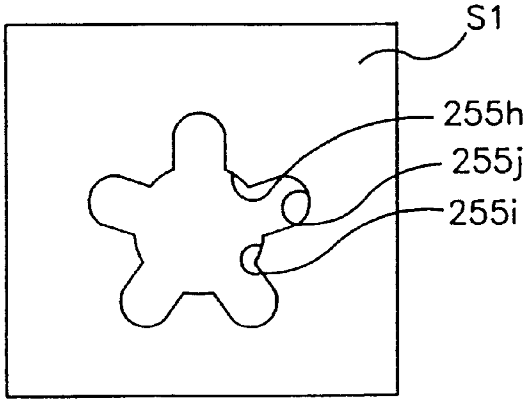
Figure 16A:
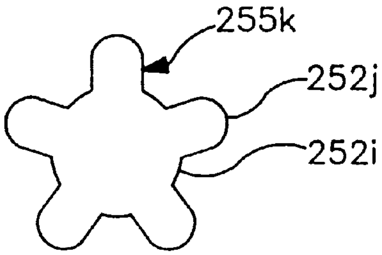
FIGS. 16*a* and 16*b* illustrate the steps of the method of stamping out of a suction valve disc in accordance with a third embodiment of the present invention.
Figure 15C:
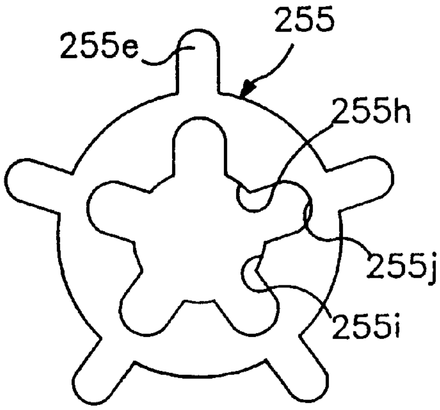
Figure 16B:
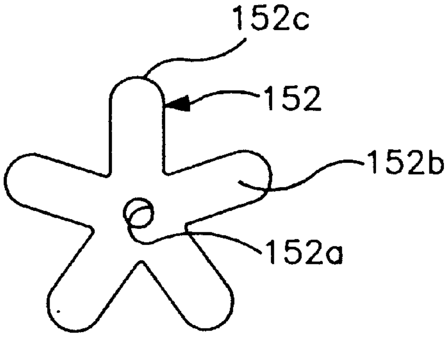
Figure 17:
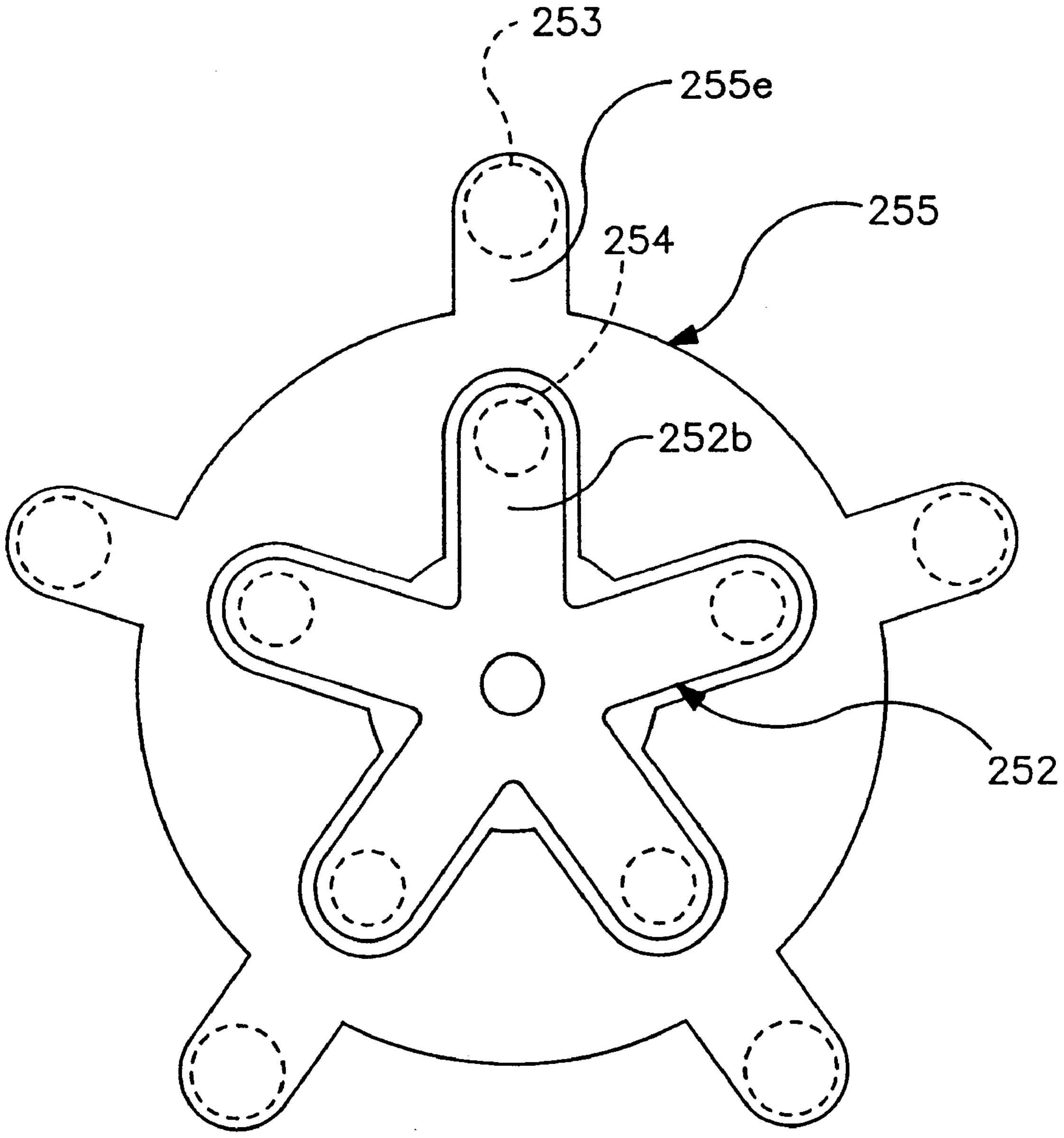
FIG. 17 is a plan view that shows the relative disposition of suction valve and discharge valve discs made by a method in accordance with a third embodiment of the present invention, when assembled within a compressor.
Figure 18:
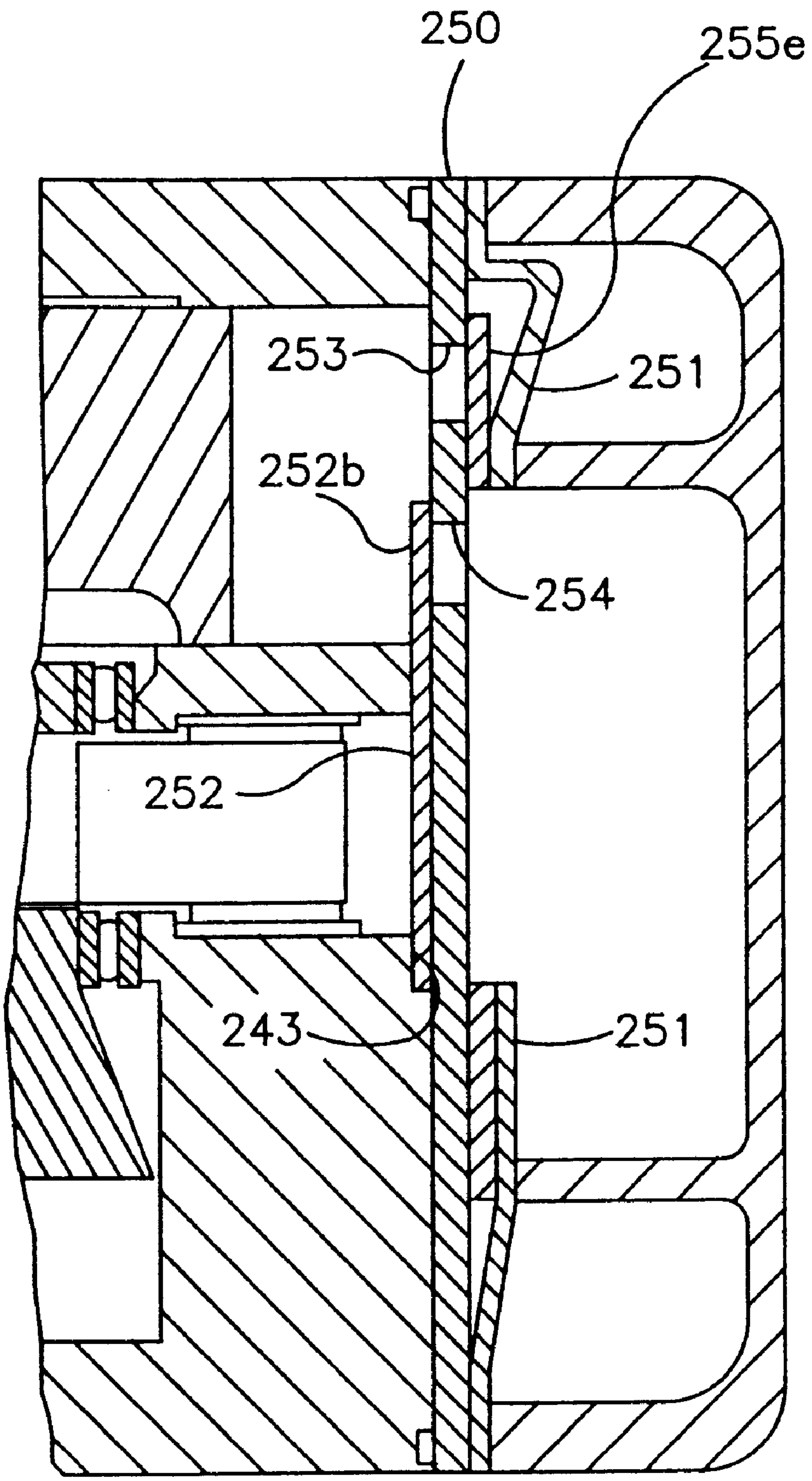
FIG. 18 is a partial, cross-sectional view of a rear portion of a slant plate-type refrigerant compressor equipped with suction valve and discharge valve discs made by a method in accordance with a third embodiment of the present invention.
Figure 19A:
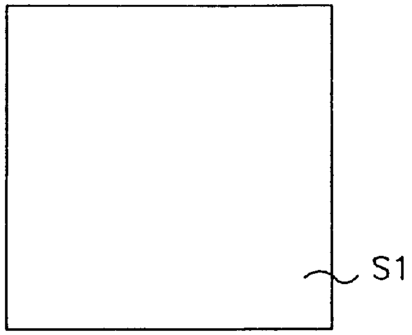
FIGS. 19*a–d* illustrate the steps of the method of stamping out of a suction valve in accordance with a variation on the first embodiment of the present invention.
Figure 19B:
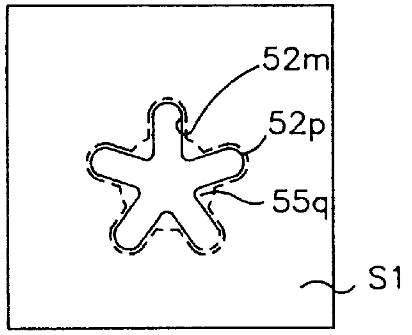

While the foregoing embodiments illustrate compressor configurations in which the suction valve disc is a large disc and the discharge valve disc is smaller and star-shaped, the structures may be reversed. FIGS. 14–18 illustrate a third embodiment of the present invention, in which the strictures are reversed. In particular, the suction valve disc is constructed of a small star shaped valve disc, and comprising the discharge valve disc by lage valve disc. In FIGS. 14*a* and 14*b*, a set of discharge valve disc 255 and suction valve disc 252 are manufactured by a method in accordance with the third embodiment of the present invention. In FIGS. 15*a*–*c* , a sequence of steps for manufacturing a discharge valve disc 255 are illustrated. Further, in FIGS. 16*a* and 16*b*, a sequence of steps for manufacturing a suction valve disc 252 are illustrated. In the same manner described with respect to the first embodiment of the present invention, a blank 255*k* is stamped out from the center of the square sheet of material sheet (FIGS. 15*b* and 16*a*). Blank 255*k* is then used to obtain a small valve disc, in this case, a suction valve disc 252. On the other hand, from the portion of the sheet remaining after removal of blank 255K (FIG. 15*b*), a large valve disc, such as a discharge valve disc 255, is stamped out. FIG. 17 depicts the relative disposition of the discharge valve disc 255 and suction valve disc 252. Contrary to the first embodiment, however, radially outer holes 253 function as discharge passages, and radially inner holes 254 function as suction passages. Thus, valve reeds 252*b* of suction valve disc 252 regulate the intake flow of refrigerant passing through suction holes 254, and valve reeds 255*e* of discharge valve disc 255 regulate the refrigerant outflow passing through discharge holes 253. This operation may be seen in FIG. 18. Thus, the suction valve may be constructed as a small star-shaped disc and the discharge valve disc as large disc, by interchanging their relative positions with respect to valve plate 250.

Therefore, the two types of valve discs may be referred to simply as "first or small valve disc" and "second or large valve disc." While preferred embodiments have been illustrated in which the number of outward projected valve reeds of first valve disc and second valve disc is five, any other number may be manufactured to correspond to the number of cylinder chambers defined in the fluid displacement apparatus.

Figure 20A:
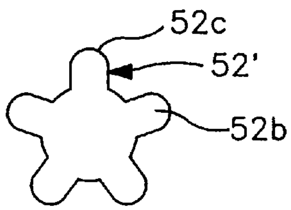
FIGS. 20*a–b* illustrate the steps of the method of stamping out of a suction valve in accordance with a variation on a first embodiment of the present invention.
Figure 19C:
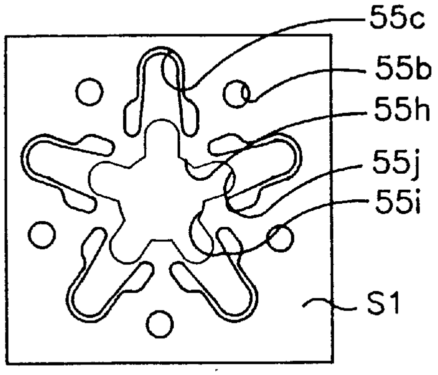
Figure 20B:
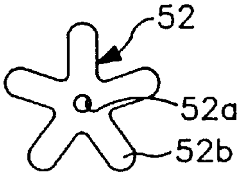
Figure 19D:
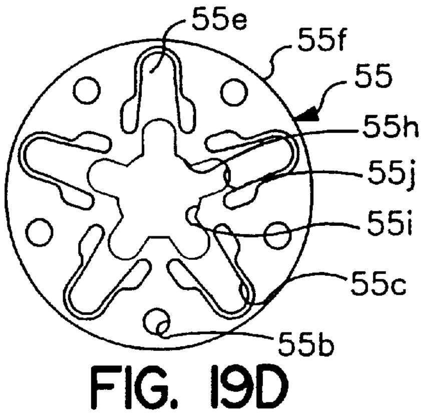

Further, the order of stamping out is not essential. While in the preferred embodiments illustrated above, the blank is first stamped out from the large valve disc, and then the small valve disc may be stamped out from this blank, this order is arbitrary. Referring to FIGS. 19 and 20, proto-small valve disc 52' may be stamped out directly from the center of material sheet S1 (FIG. 19*b*), and then the inner peripheral strips 55*p* and 55*q* may be stamped from central inner edge 55*m* of the remaining sheet.

Although the present invention has been described in detail in connection with preferred embodiments, the invention is not limited thereto. It will be understood by those of ordinary skill in the art that variations and modifications may be made within the scope of this invention, as defined by the following claims.

What is claimed is:

1. A method for manufacturing a first valve disc and a second valve disc for use in a fluid displacement apparatus having a longitudinal axis and a plurality of cylinder chambers surrounding said axis, comprising the steps of:

providing a sheet of valve material;

cutting a through-hole having a plurality of extended openings in said sheet to produce said first valve disc with a plurality of arms, wherein said plurality of arms extend into said plurality of extended openings; and cutting a plurality of arch-shaped openings in said sheet, spaced around said through-hole and corresponding to each of said extended openings of said through-hole, to produce said second valve disc.

2. The method of claim 1, wherein said sheet is square.

3. The method of claim 1, wherein said steps of cutting comprise stamping said sheet in a stamping press.

4. The method of claim 1, wherein said first valve disc is star shaped.

5. The method of claim 4, wherein said first valve disc has five arms.

6. The method of claim 4, wherein said first valve disc has six arms.

7. The method of claim 4, wherein said first valve disc has seven arms.

8. The method of claim 1, wherein said through-hole is geometrically, centrally located in said sheet.

9. The method of claim 1, further comprising cutting at least one mounting hole in said sheet.

10. The method of claim 1, further comprising cutting at least one mounting hole in said first valve disc.

11. The method of claim 1, wherein said step of cutting said plurality of arch-shaped openings comprises the sub-steps of cutting an inner, curved cut joined with an outer, curved cut and removing a portion of said sheet between said inner cut and said outer cut.

12. The method of claim 1, further comprising cutting said sheet into form a circular edge surrounding said plurality of arch-shaped openings.

13. The method of claim 1, wherein each of said arch-shaped openings has a pair of interior ends located proximally to said through-hole and further comprising the steps of cutting between said interior ends of adjacent arch-shaped openings and removing a portion of said sheet external to openings to form a second valve disc with a plurality of arms.

14. The method of claim 1, further comprising the step of cutting a peripheral edge from the circumference of said first valve disc.

15. A method for manufacturing a first valve disc and a second valve disc for use in a fluid displacement apparatus having a longitudinal axis and a plurality of cylinder chambers surrounding said axis, comprising the steps of:

providing a sheet of valve material;

cutting a through-hole having a plurality of extended openings in said sheet to produce said first valve disc with a plurality of arms, wherein said plurality of arms extend into said plurality of extended openings; and cutting away an outer portion of said sheet to form a plurality of arms on an inner portion of said sheet, spaced around said through-hole and corresponding to each of said extended openings of said through-hole, to produce said second valve disc.

16. The method of claim 15, further comprising the step of cutting a peripheral edge from the circumference of said first valve disc.

17. A method for manufacturing a fluid displacement apparatus having a first valve disc having a plurality of outwardly projecting valve reeds and a second valve disc, which is substantially star-shaped and has a plurality of second outwardly projecting valve reeds corresponding to each of said plurality of outwardly projecting reed valves on said first valve disc; comprising the step of:

cutting said first and said second valve disc from a common surface area of sheet of valve material, wherein said first valve disc is cut from a central portion of said second valve disc, thereby forming a central through-hole in said second valve disc, wherein said plurality of outwardly projecting valve reeds extend into said central through-hole in said second valve disc.

18. The method of claim 17, wherein a base portion of each of said outwardly projecting valve reeds of said second valve disc are cut off, such that a cut off amount of cut off forms a tip portion of each of said outwardly projecting valve reeds of said first valve disc.

19. The method of claim 17, wherein a shape of an outer edge of said first valve disc is substantially similar to a shape of an inner edge of said central through-hole of said second valve disc.

* * * * *